US005512803A

United States Patent [19]
Endo et al.

[11] Patent Number: 5,512,803
[45] Date of Patent: Apr. 30, 1996

[54] APPARATUS FOR COMPENSATING FOR IMAGE ROTATION IN A CRT DISPLAY AND METHOD FOR PREPARING THE SAME

[75] Inventors: Kazuhiko Endo; Hideyuki Kokubun, both of Fukushima; Takehiro Misonou, Kanagawa, all of Japan

[73] Assignee: Sony Corporation, Tokyo, Japan

[21] Appl. No.: 306,743

[22] Filed: Sep. 15, 1994

[30] Foreign Application Priority Data

Sep. 16, 1993  [JP]  Japan .................................. 5-230219
Sep. 16, 1993  [JP]  Japan .................................. 5-230238

[51] Int. Cl.$^6$ ........................................... H01J 29/56
[52] U.S. Cl. .................................... 315/370; 315/8
[58] Field of Search .................. 315/370, 8, 85; 361/150

[56] References Cited

U.S. PATENT DOCUMENTS

| 4,023,129 | 5/1977 | Kratz et al. | 335/213 |
| 4,899,082 | 2/1990 | Sands | 315/8 |
| 5,317,239 | 5/1994 | Ohguro et al. | 315/370 |

*Primary Examiner*—Theodore M. Blum
*Attorney, Agent, or Firm*—Peter C. Toto; Jerry A. Miller

[57] ABSTRACT

A video display device has a CRT, a deflection yoke and control means for producing a compensation current. A coil cover has a coil winding element and is attached to a front part of the yoke. A conductor is wound around and supported by only one surface of the coil winding element. A control means is coupled to a first and a second ends of the conductor.

20 Claims, 14 Drawing Sheets

APPARATUS FOR COMPENSATING FOR IMAGE ROTATION IN A CRT DISPLAY AND METHOD FOR PREPARING THE SAME

FIELD OF THE INVENTION

This invention generally relates to the field of video display devices which include a cathode ray tube, and more particularly to those display devices which include a apparatus for compensating for image rotation.

BACKGROUND OF THE INVENTION

In a cathode ray tube (CRT), such as those used in color television sets or computer display monitors and the like, it is important that the electron beam used to excite, or illuminate, the CRT screen be properly aligned so as to strike or excite only the intended point or pixel (pixels).

However, CRT displays are prone to a problem called "image rotation" wherein the projected image appears rotated with respect to the horizontal axis of the screen. Image rotation is caused when the electron beam emitted from an electron gun of a CRT is deflected by an external magnetic field. One example of an external magnetic field is terrestrial magnetism. For example, as shown in FIG. 8, a CRT 1 is calibrated so as to project a normal image A on a screen, which is not rotated with respect to the horizontal axis of the screen, when it is manufactured. However when the display is used at a location having a different latitude from the latitude where the display was manufactured, in other words, the display is used at a location having different terrestrial magnetism from the terrestrial magnetism of where the display was manufactured, the image is rotated like the image B in FIG. 8. The amount of rotation may vary both in direction and magnitude depending on the geographic location of the display or the orientation of the display with respect to the external magnetic field.

Generally an image rotation compensating coil 10 is provided in a CRT which is to be used at a location having different terrestrial magnetism from the terrestrial magnetism of where the display was manufactured, as shown in FIG. 9(A), FIG. 9(B) and FIG. 10. The magnetic field generated by the image rotation compensating coil 10 offsets the terrestrial magnetism so that the rotated image B is corrected to the normal image A.

FIG. 9(A) and FIG. 9(B) show an example of a deflection yoke 2 having an image rotation compensating coil. A coil cover 3 is attached to a front part of the deflection yoke 2 used in a CRT 1 as shown in FIG. 9(A). The image rotation compensating coil 10 is wound around a coil cover 3 as shown in the figures. Two coil-winding frames 31 that are part of the coil cover 3 are provided at an outside surface of the coil cover 3 and are used to retain the image rotation compensating the coil 10. As shown in FIG. 9(B), a conductor 11 is wound between the coil winding frames 31 having a certain number of turns so as to form the image rotation compensating coil 10. Both terminals of the image rotation compensating coil 10 are connected to two pin terminals 32 which are provided at a side surface of the coil-winding frame 31. A certain electric current is supplied from a control means for controlling a direction or an amount of the electric current (not shown in figures) to the pin terminals 32. A magnetic field is thereby generated on the image rotation compensating coil 10.

Because the coil cover 3 includes the coil-winding frame 31, a mold for molding the coil cover 3 is complicated and the cost for manufacturing the coil cover 3 therefore becomes expensive.

Furthermore, when a plurality of deflection yokes 2 of the type shown in FIG. 9 are conveyed by a conveying belt 4 during manufacture (as shown in FIG. 11) and inclined at an angle 81, the deflection yoke may come in contact with the other deflection yokes. In this case, a part, such as a coil-winding frame 31, of the deflection yoke 2 may contact the image rotation compensating coil 10, and may damage the image rotation compensating coil 10. As a result, the image rotation compensating coil 10 may not operate properly.

FIG. 10 shows another example of a deflection yoke having an image rotation compensating coil 10. A plurality of coil retaining air-core parts 21 are provided at a front part of a deflection yoke 2. The coil retaining part 21 is formed by folding an end of a strip provided at the front part of the deflection yoke 2. Then, the image rotation compensating coil 10 is attached to the coil retaining part 21. In this case, both terminals of the image rotation compensating coil 10 are also connected to two pin terminals 32 (not shown in FIG. 10). An appropriate electric current is supplied from a control means (not shown in figures) for controlling the direction and amount of the electric current to the pin terminals 32.

In the manufacturer of the deflection yoke of the type shown in FIG. 10, it is necessary to have two steps including the first step for making an air-core image rotation compensating coil 10 and the second step for attaching the air-core image rotation compensating coil 10 to the deflection yoke 2. This increases the costs of manufacturing the CRT. Further an outer diameter of the deflection yoke shown in FIG. 10 is bigger than an outer diameter of the deflection yoke shown in FIG. 9(A) because of the coil retaining part 21. Such a design does not use an inside space of a television or a monitor efficiently. Furthermore, because the image rotation compensating coil 10 is exposed as shown in FIG. 10, it can easily contact other parts of the CRT causing damage the image rotation compensating coil 10. Accordingly, it would be desirable to have an image rotation compensation coil not having the problems associated with the prior art devices.

SUMMARY OF THE INVENTION

One object of the present invention is to provide a new and improved video display device for displaying an image on a screen.

Another object of the present invention is to provide a new and improved deflection apparatus for use with a cathode ray tube.

According to a first embodiment of the present invention, a video display device for displaying an image on a screen has a cathode ray tube including an electron gun and a screen. The electron gun emits an electron beam along a path toward the screen and the electron beam forms an image on the screen. Further, the video display device has a deflection yoke for deflecting the electron beam and compensating for rotation of the image. The yoke is positioned between the electron gun and the screen. A coil cover having a coil winding element is attached to a front part of the yoke. A conductor having a first end and a second end is wound around and supported by only one surface of the coil winding element. A control means for producing a compensation current is coupled to the first and the second ends of the conductor.

According to a second embodiment of the present invention, a method for preparing an image rotation compensating coil on a deflection yoke includes the steps of attaching a coil cover having a coil winding element to a front part of the deflection yoke, determining a coil winding area for winding a conductor on a surface of the coil winding element and providing a coil winding apparatus at both sides of the coil winding area for winding the conductor within the coil winding area. Further the method includes the steps of winding the conductor by a predetermined number of turns within the coil winding apparatus and removing the coil winding apparatus from the coil winding area.

DETAILED DESCRIPTION OF THE INVENTION

Figure 1:
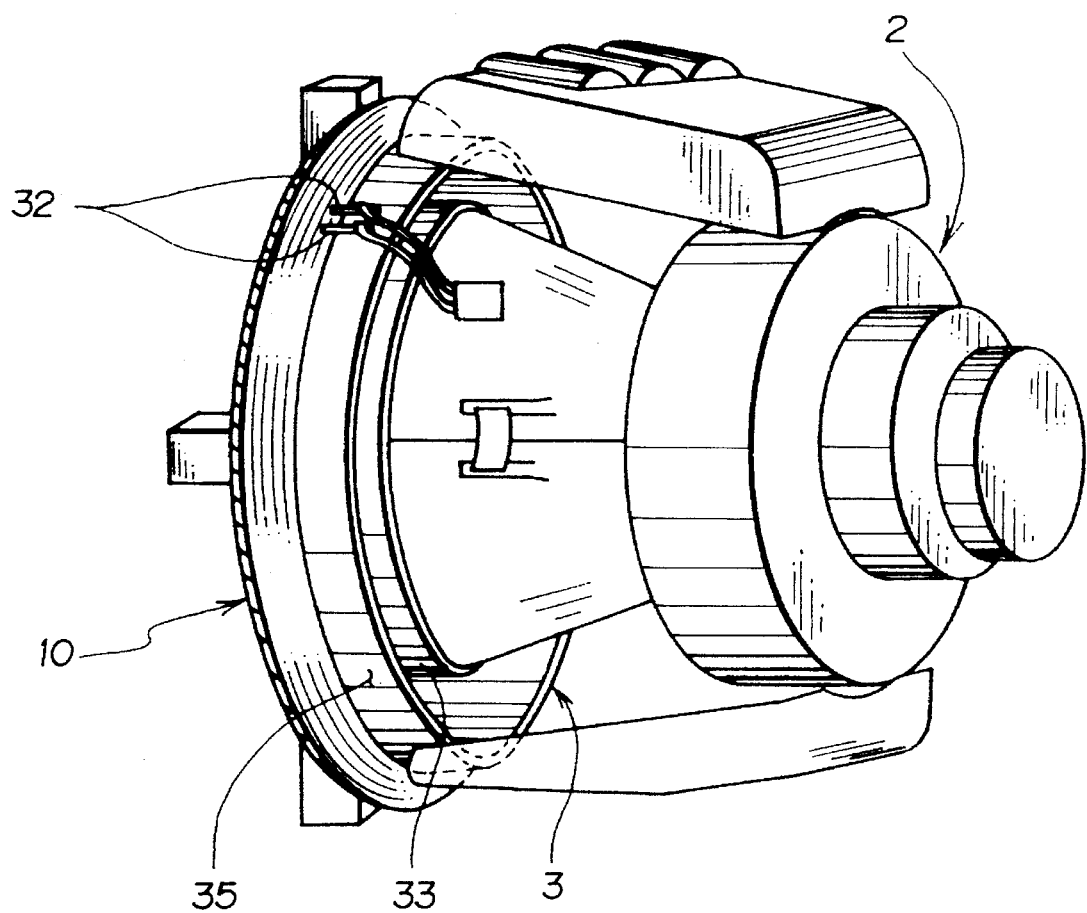
FIG. 1 is a perspective view showing an example of a deflection yoke having an image rotation compensating coil.

FIG. 1 shows an example of a deflection yoke 2 having an image rotation compensating coil 10 of the present invention. The deflection yoke 2 is provided in a monitor 5 (shown in FIG. 8) which may be used at a location having a different latitude from the latitude where the display was manufactured. In other words, the monitor is used at a location having different terrestrial magnetism from the terrestrial magnetism of where the monitor was manufactured. A coil cover 3 is attached at a front part of the deflection yoke 2 and the image rotation compensating coil 10 is wound around the coil cover 3 as shown in FIG. 1.

Figure 2:
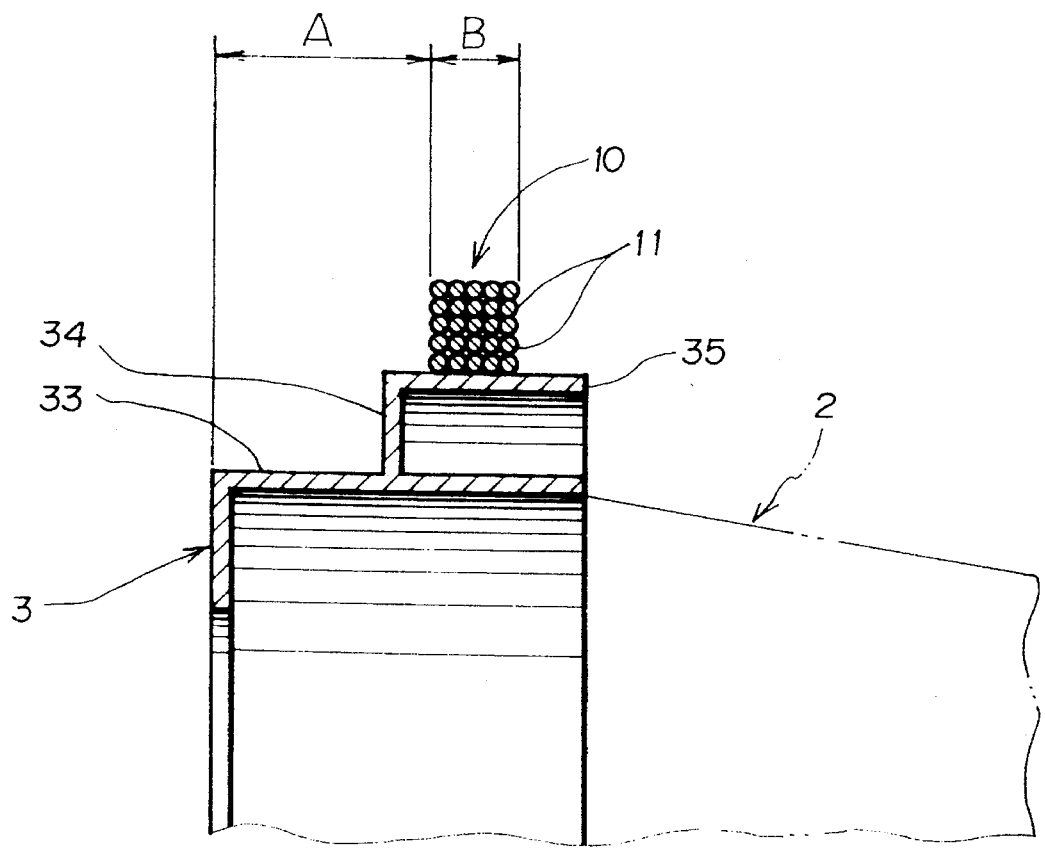
FIG. 2 is a cross-sectional view showing a winding part of the image rotation compensating coil of FIG. 1.

FIG. 2 shows a cross-sectional view of the deflection yoke 2. The coil cover 3 has a L-shaped section and includes a deflection yoke insertion part 33. A supporting element 34 is provided at a center of the deflection yoke insertion part 33. A coil winding element 35 extending backward is provided at an end of the supporting element 34. The coil winding element 35 is oval in cross-section (see FIG. 4) and has a substantially planar outside surface for receiving the image rotation compensating coil 10. A coil winding area B having a predetermined width is provided at a position which has a distance A from the front end of the coil cover 3. An self-adhesive type conductor 11 such as an alcohol adhesive conductor is wound around the coil winding area B forming the image rotation compensating coil 10.

Figure 3A:
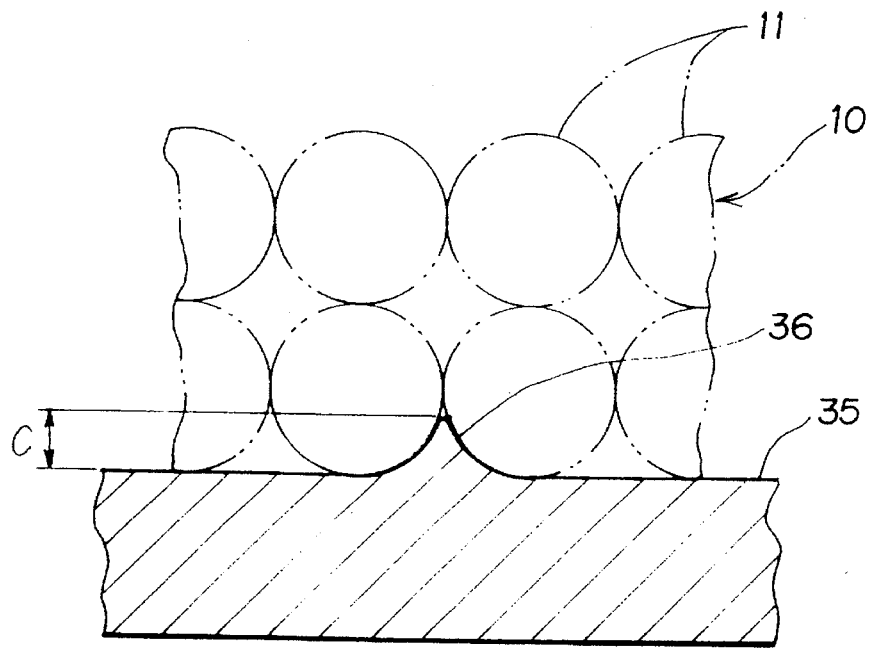
FIG. 3(A) is a cross-sectional view showing a projection of an image rotation compensating coil for retaining an image rotation compensating coil.

A projection 36 for retaining the image rotation compensating coil 10 is provided on the coil winding area B, for example, at a center of the coil winding area B as shown in FIG. 3(A). A height C of the projection 36 is the same as or a little smaller than the radius of the conductor 11. The surface of the projection 36 contacting the conductor 11 is a circular arc so that the conductor 11 winding around a side of the projection 36 does not separate from another conductor winding around another side of the projection 36. Thus, the projection 36 is provided between two adhered conductors 11, contacting each so as to prevent the image rotation compensating coil 10 from shifting on the planar outside surface of the coil winding element 35 and/or from coming off the coil winding element 35 entirely.

Figure 3B:
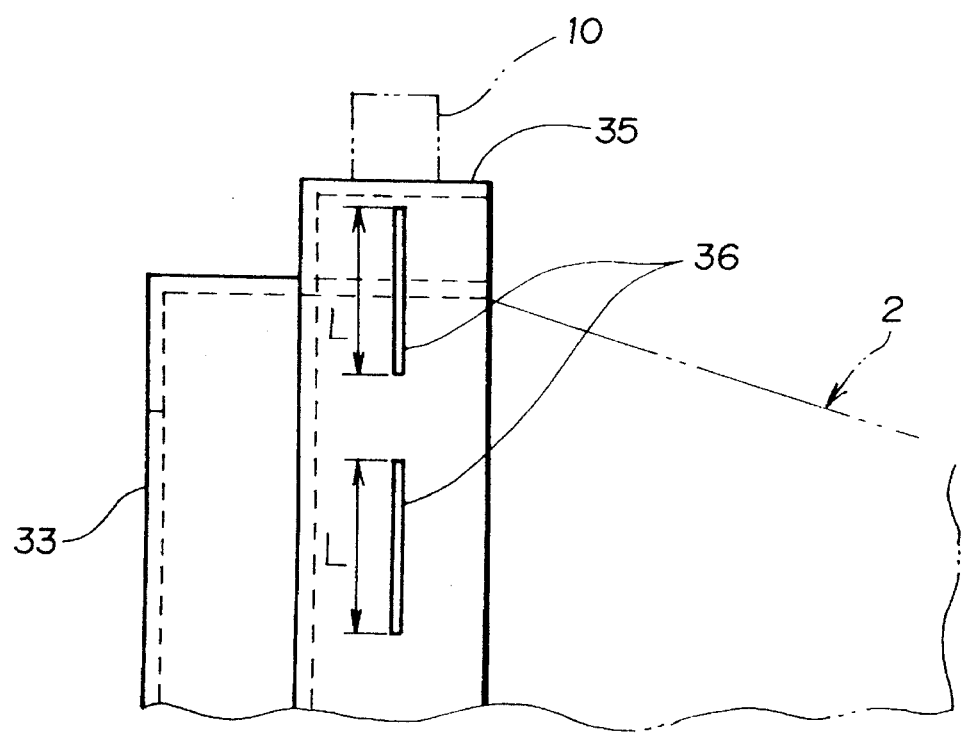
FIG. 3(B) is a planar view showing the projection of the image rotation compensating coil of FIG. 3(A).

The projection 36 has a length L along the otherwise planar outside surface of the coil winding element 35. For example, the length L could be 30 mm as shown in FIG. 3(B). Further, a plurality of projections are provided at predetermined intervals along the circumference of the outside surface of the coil winding element 35. For example, the conductor wound at a left side of the projection is wound at a right side through the space provided between two projections. It prevents the conductor from getting on the projection 36 and cutting off.

Figure 4:
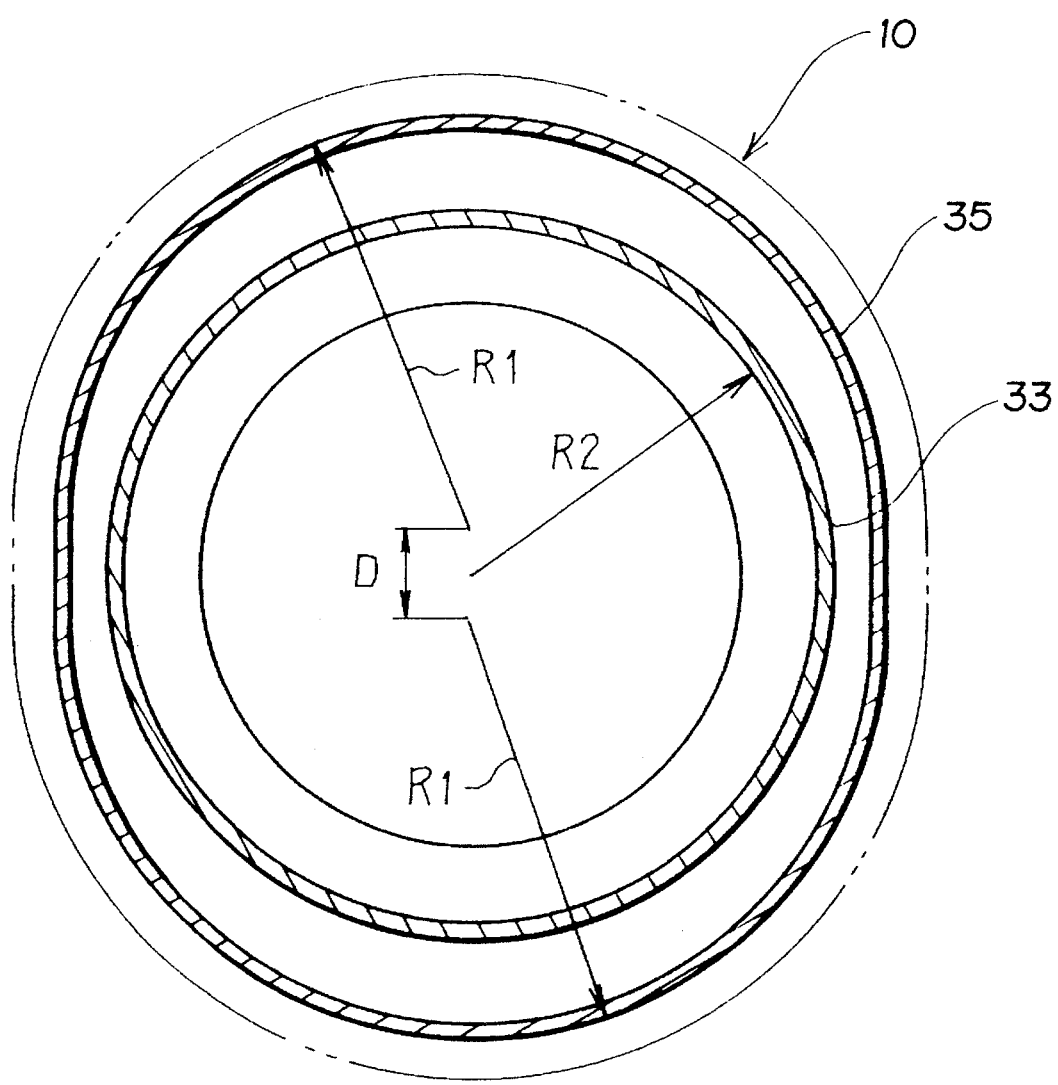
FIG. 4 shows the shape of a coil winding part.

As shown in FIG. 4, the coil winding element 35 of the coil cover 3 is formed to be an oval having half circles at both sides. The half circles have radius R1. The center of one of the half circles has a distance D from the center of the other half circle. The deflection yoke insertion part 33 is formed to be substantially a circle having a radius R2. Importantly, since the coil winding element 35 is formed to be an oval, the image rotation compensating coil 10 is prevented from easily rotating along the outside surface of the coil winding element 35.

Figure 10:
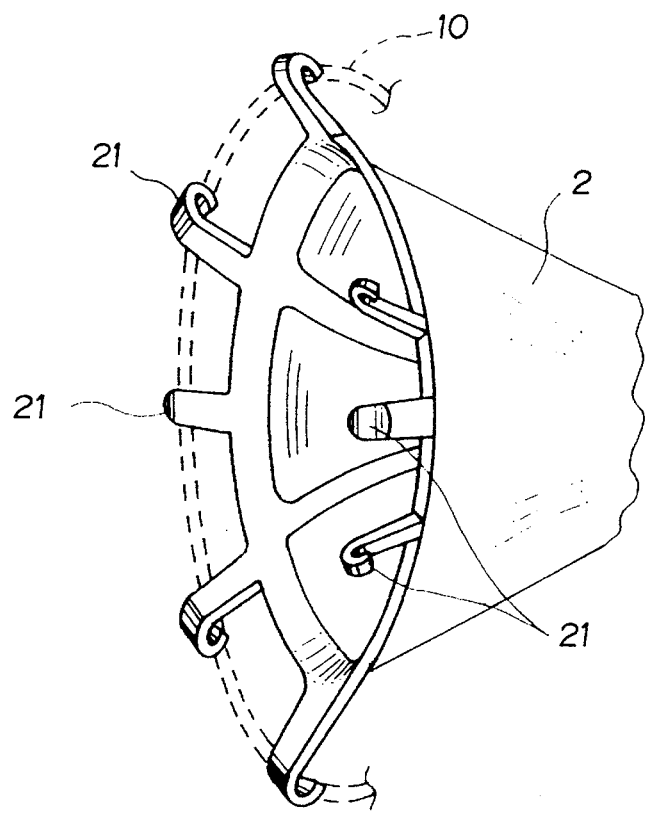
FIG. 10 is a perspective view showing another example of a conventional image rotation compensating coil.

Because the above-disclosed deflection yoke 2 having the image rotation compensating coil 10 does not need a coil retaining part 21 as shown in FIG. 10, the outer diameter of the deflection yoke 2 may be reduced. Further because the above-disclosed deflection yoke 2 does not need a special part for preventing a rotation of an image rotation compensating coil 10, the structure of the coil cover 3 is simplified.

Next, a method for assembling the image rotation compensation coil 10 is explained with reference to FIG. 5, FIG.

Figure 5A:
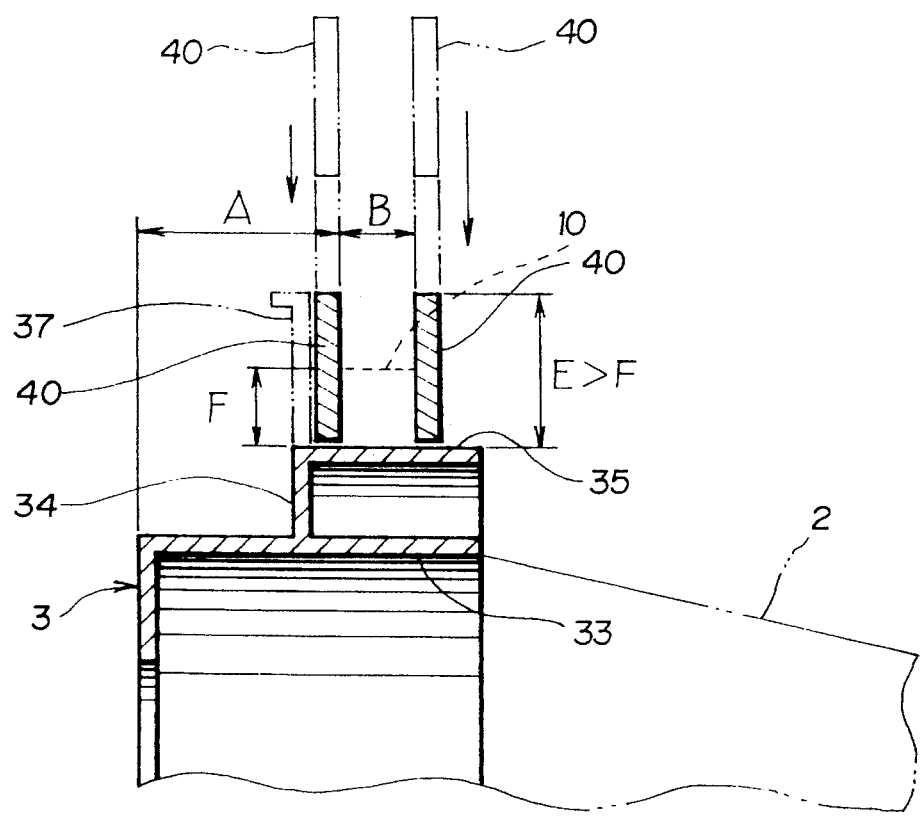
FIG. 5(A) is a view explaining the first step for making an image rotation compensating coil.
Figure 7:
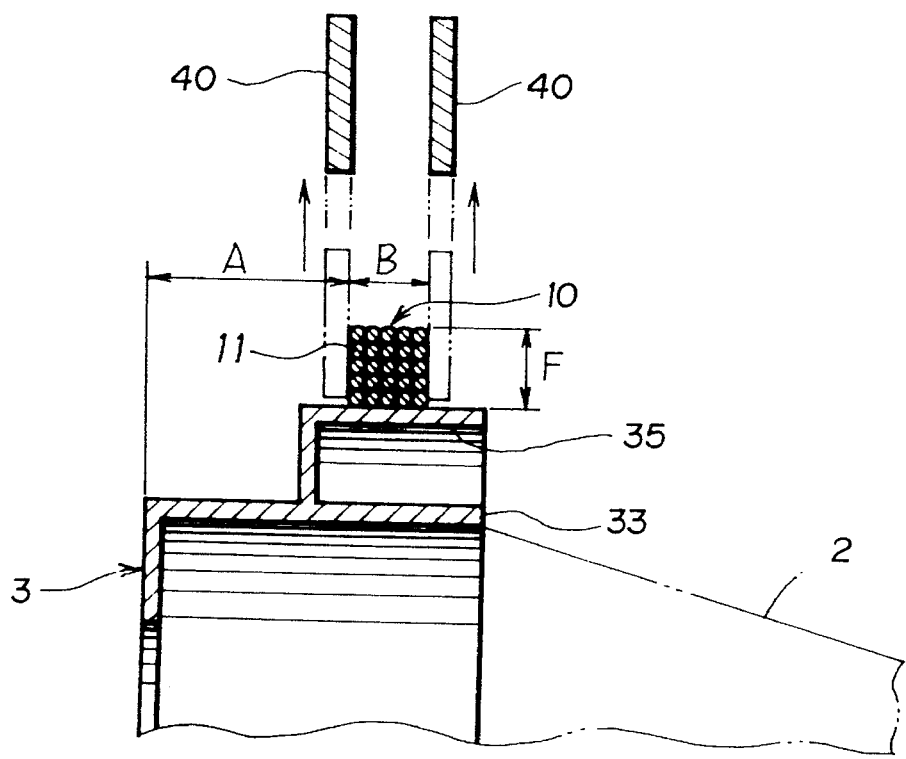
FIG. 7 is a view explaining the third step for making an image rotation compensating coil.

6 and FIG. 7. A coil winding area B is provided on a planar outer surface of the coil winding element 35 of the coil cover 3 as shown in FIG. 5(A). The coil winding area B has a distance A from the front end of the coil cover 3. An apparatus for winding a coil 40 is provided at both sides of the coil winding area B. The height E of the apparatus for winding a coil 40 is greater than the expected height F of the image rotation compensating coil 10 so as to wind the conductor 11 easily.

Figure 5B:
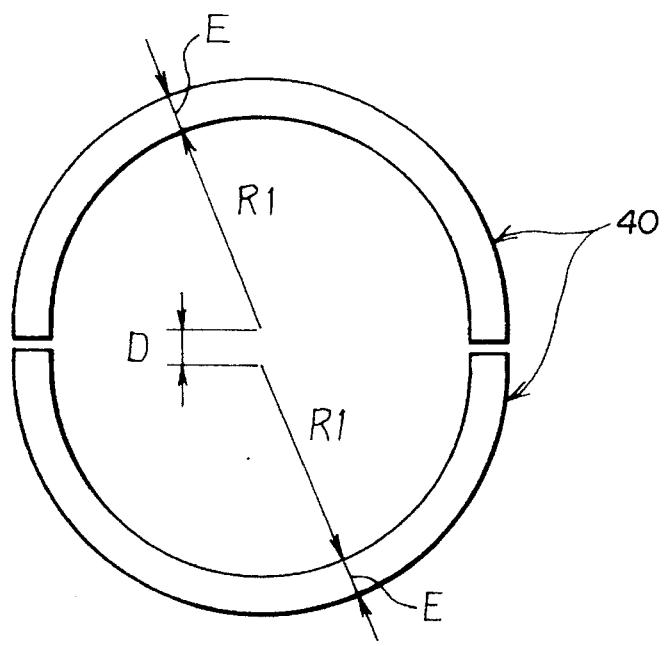
FIG. 5(B) shows the shape of a tool for making an image rotation compensating coil.

The apparatus for winding a coil 40 is formed so that the inner shape of the apparatus for winding a coil 40 is substantially the same as the outer shape of the coil winding element 35, i.e., oval, as shown in FIG. 5B. Further, the apparatus for winding a coil 40 is divided into two parts at the center. As a result, even where a flange 37 is provided near the coil winding area B as shown by a chain line in FIG. 5(A), the apparatus for winding a coil 40 is detached easily after forming the image rotation compensating coil 10.

Figure 6:
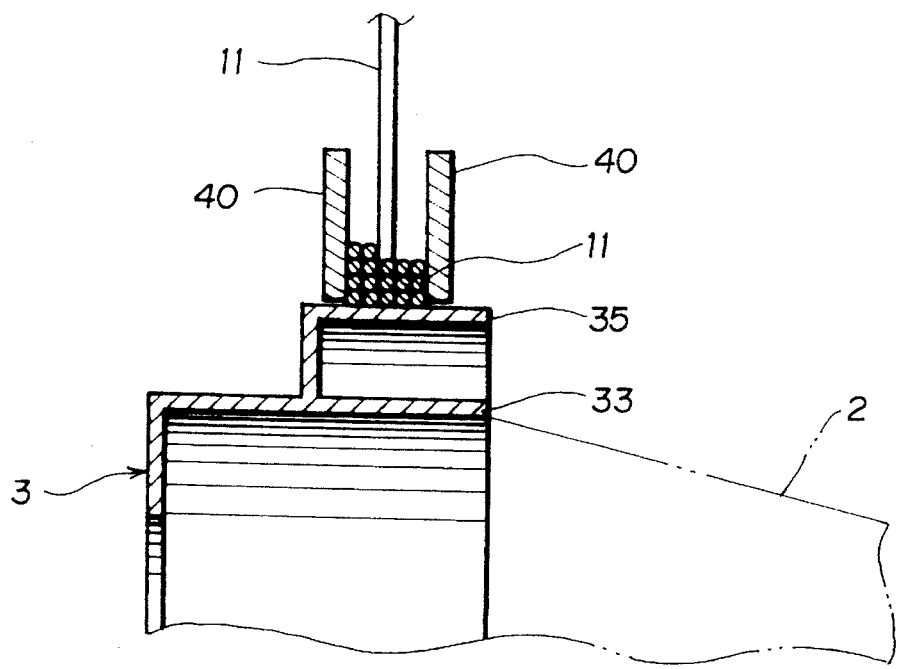
FIG. 6 is a view explaining the second step for making an image rotation compensating coil.

After the apparatus for winding a coil 40 is provided at the both sides of the coil winding area B, the conductor 11, which, as described above, is a self-adhesive such as an alcohol adhesive conductor, is wound around the coil winding element 35, being guided by the apparatus for winding a coil 40 as shown in FIG. 6. The conductor then adheres to itself. After the conductors are hardened, one part of the apparatus for winding a coil 40 is removed in the direction of diameter of the coil winding element 35 as shown in FIG. 7. The image rotation compensating coil 10 is thereby formed at a predetermined position, which has a distance A from the front end of the coil cover 3, a width B and a height F. Both ends of the image rotation compensating coil 10 are connected to the pin terminals 32 (FIG. 1).

Figure 8:
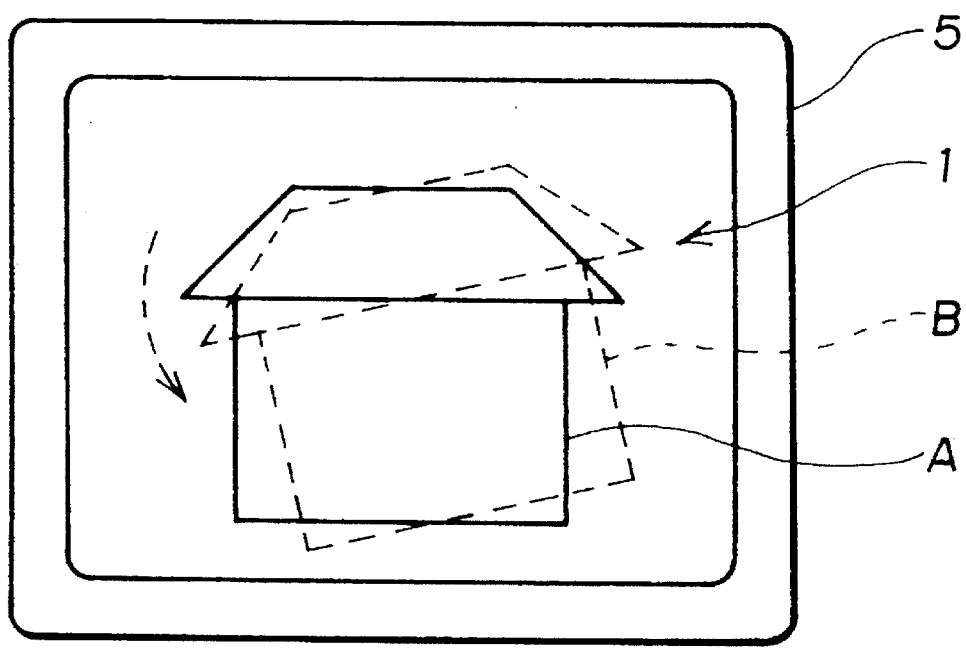
FIG. 8 is an example of image rotation caused by a change of a magnetic field.

After the image rotation compensating coil 10 is wound around the coil cover 3, the coil cover 3 is attached to the deflection yoke 2. Then, the deflection yoke 2 is inserted in the CRT 1 (FIG. 8). A control means for controlling the direction and amount of an electric current (not shown in figures) is connected to the pin terminals 32. The direction and amount of the magnetic field generated by the image rotation compensating coil 10 are controlled thereby.

The CRT 1 having the deflection yoke 2 wound by the image rotation compensating coil 10 is put in the monitor 5. Therefore even though the monitor 5 is used at a location having different terrestrial magnetism from the terrestrial magnetism of where the monitor was manufactured, the rotated image B is compensated to the normal image A.

In the above-description, a long conductor 11 is wound with a certain number of turns so as to form the image rotation compensating coil 10. However a plurality of conductors 11 previously formed to a band shape may be also used for the image rotation compensating coil 10.

Figure 9A:
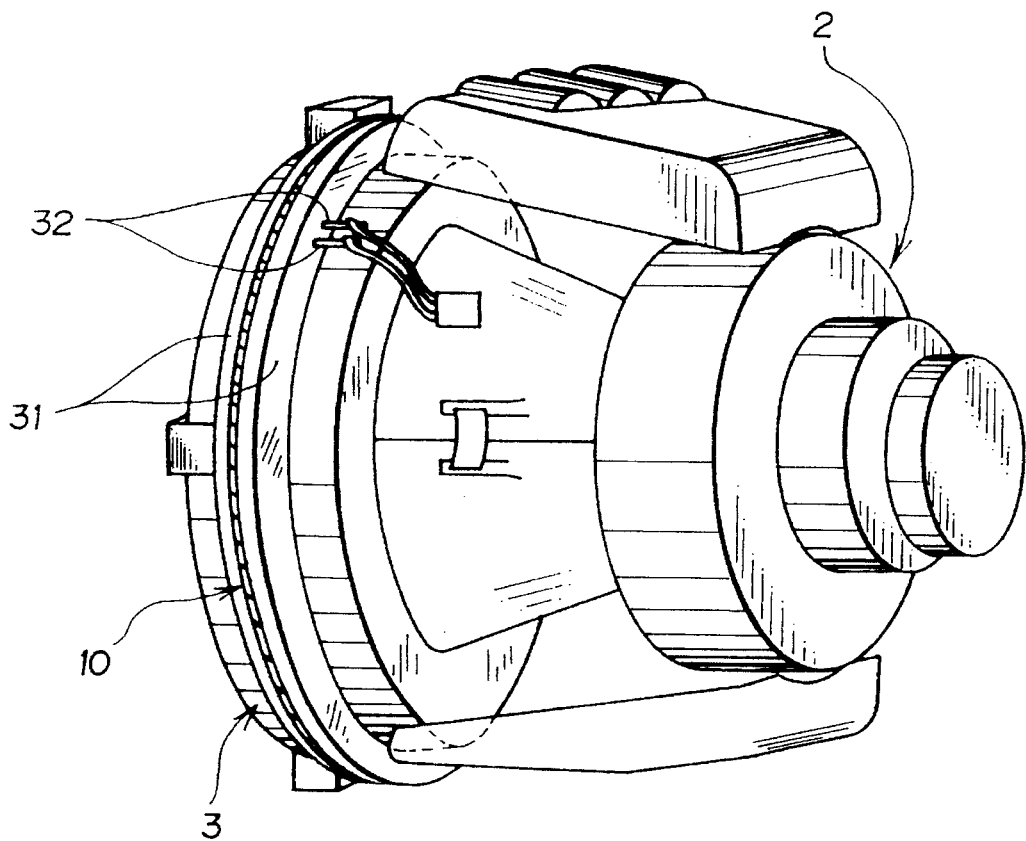
FIG. 9(A) is a perspective view showing an example of a conventional image rotation compensating coil.
Figure 9B:
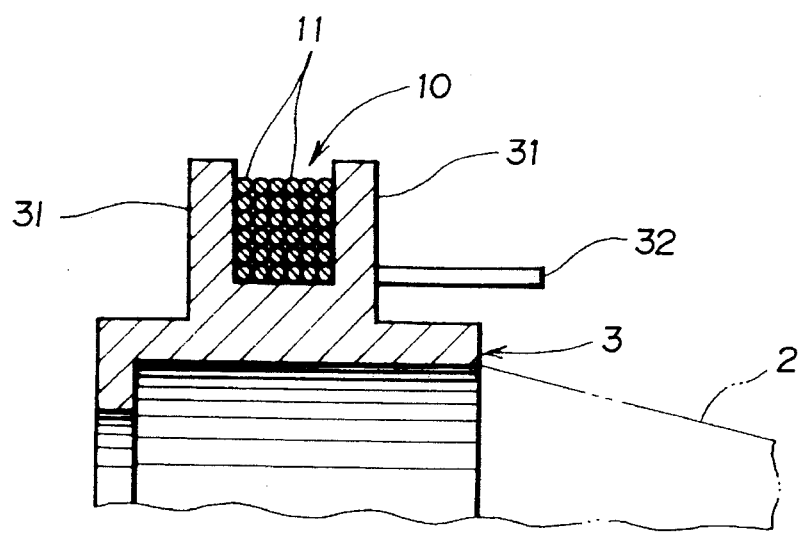
FIG. 9(B) is a cross-sectional view showing an example of a conventional image rotation compensating coil.

In the present invention, a coil cover is attached to a deflection yoke of a CRT and a conductor is wound around a planar outer surface of the coil cover so as to form an image rotation compensating coil. Advantageously, the present invention does not need a coil-winding frame 31 on a deflection yoke of the type shown in FIG. 9. As such, the shape of a mold is simplified and manufacturing costs are decreased. Further, the image rotation compensating coil of the present invention is made in one step of the type shown in FIG. 10. In contrast, the conventional image rotation compensating coil was made by two steps including a step of forming an air-core image rotation compensating coil and a step of attaching the air-core image rotation compensating coil to the deflection yoke as described above. As such, manufacturing time and expense may be decreased in the present invention.

Furthermore, because the present invention does not need to provide a coil retaining part at a periphery of a deflection yoke as shown in FIG. 10, the size of the deflection yoke may be decreased. This result is a more efficient use of space inside a monitor.

Figure 12:
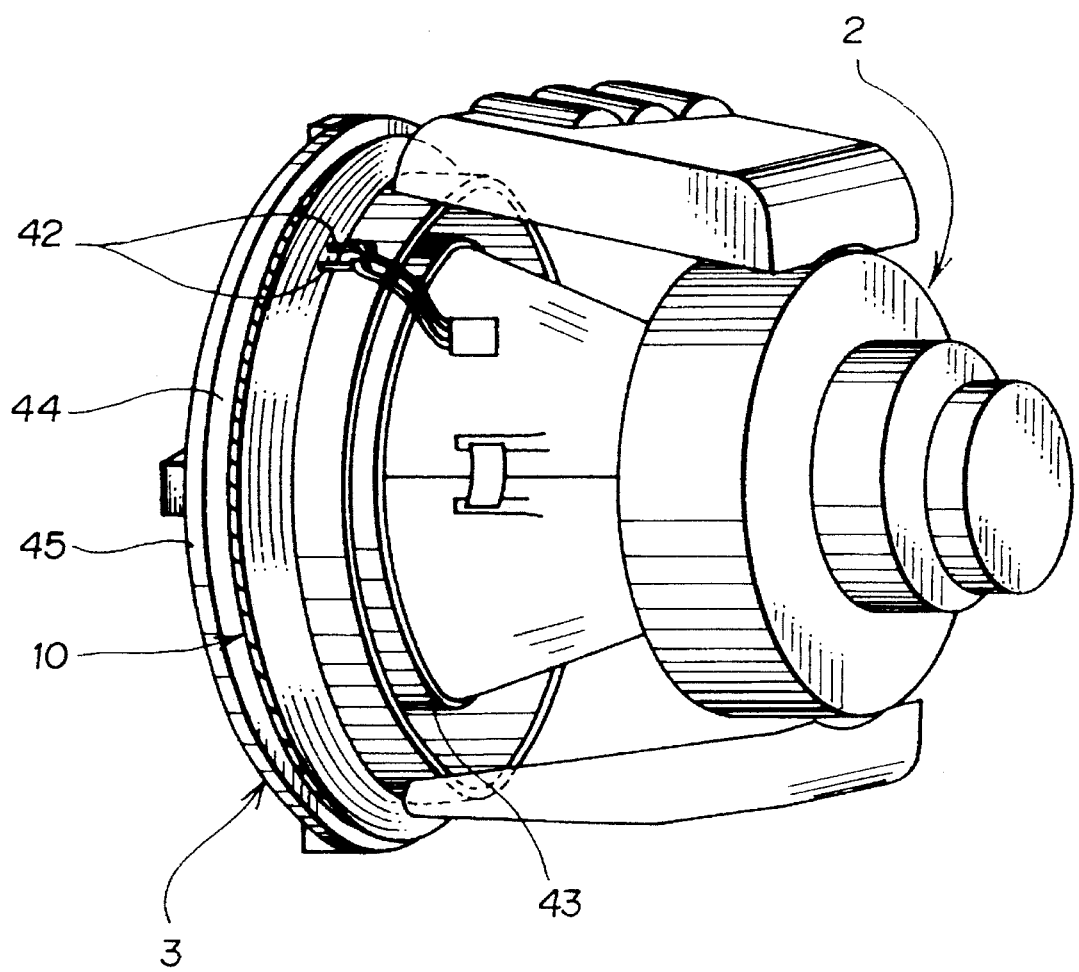
FIG. 12 is a perspective view showing another example of a deflection yoke having an image rotation compensating coil.

Next, another example of the present invention is explained in connection with FIG. 12. FIG. 12 shows a structure of a deflection yoke 2 provided with an image rotation compensating coil 10 of the present invention. This deflection yoke is put in a CRT which is used at a location having different terrestrial magnetism from the terrestrial magnetism of where the CRT was manufactured (FIG. 8). A coil cover 3 is attached to the front part of the deflection yoke 2. The image rotation compensating coil 10 is wound around the coil cover 3 as shown in FIG. 12.

Figure 13:
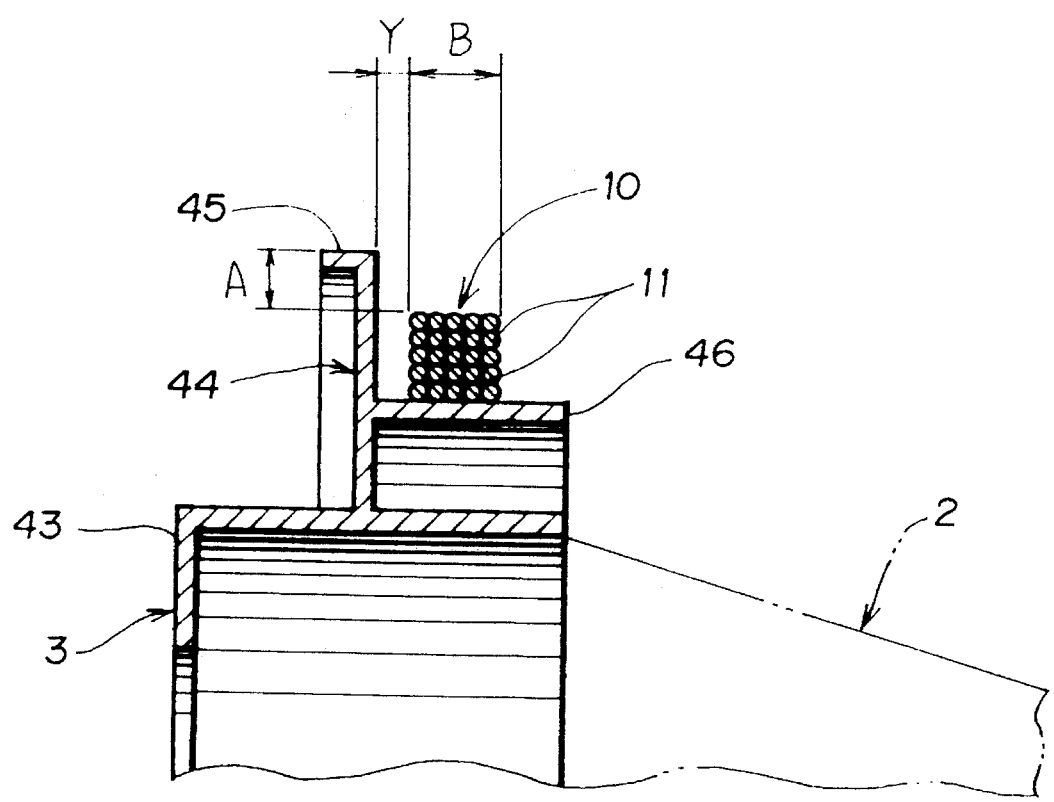
FIG. 13 is a cross-sectional view showing a winding part of the image rotation compensating coil of FIG. 12.

The coil cover has a cylindrical deflection yoke insertion part 43 including a L-shaped section as shown in FIG. 13. A flange 44 is provided at a center of the deflection yoke insertion part 43 so that the flange 44 stands out from an outside surface of the image rotation compensating coil 10. There is a distance A between an end of the flange 44 and the outside surface of the image rotation compensating coil 10. A tab element 45 projecting forward is provided at an end of the flange 44. The projection element 45 is provided along the entire circumference of the flange 44.

An oval coil winding element 46 extending backward is provided at a certain position of the flange 44. This coil winding element 46 is parallel to a cylindrical surface of the deflection yoke insertion part 43. A self-adhesive conductor 11 such as an alcohol adhesive conductor is wound a certain number of turns at a coil winding area B provided on the coil winding element 46 so as to form the image rotation compensating coil 10. Both ends of the image rotation compensating coil 10 are connected to pin terminals 42 as shown in FIG. 12. An electric current is supplied from an outside control means (not shown in figures) to the pin terminals 42 so that a magnetic field is generated on the image rotation compensating coil 10.

Figure 14A:
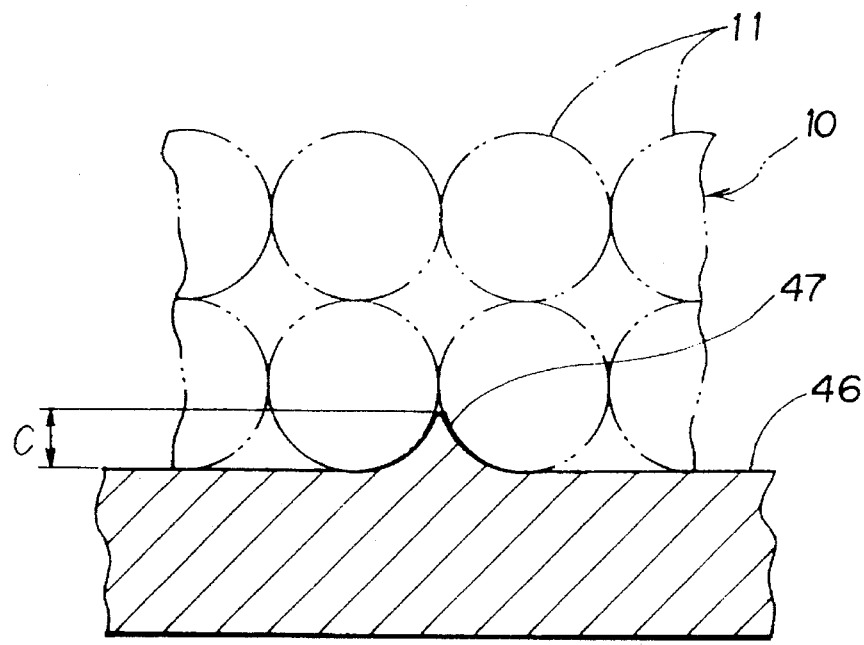
FIG. 14(A) is a cross-sectional view showing a projection for retaining an image rotation compensating coil.
Figure 14B:
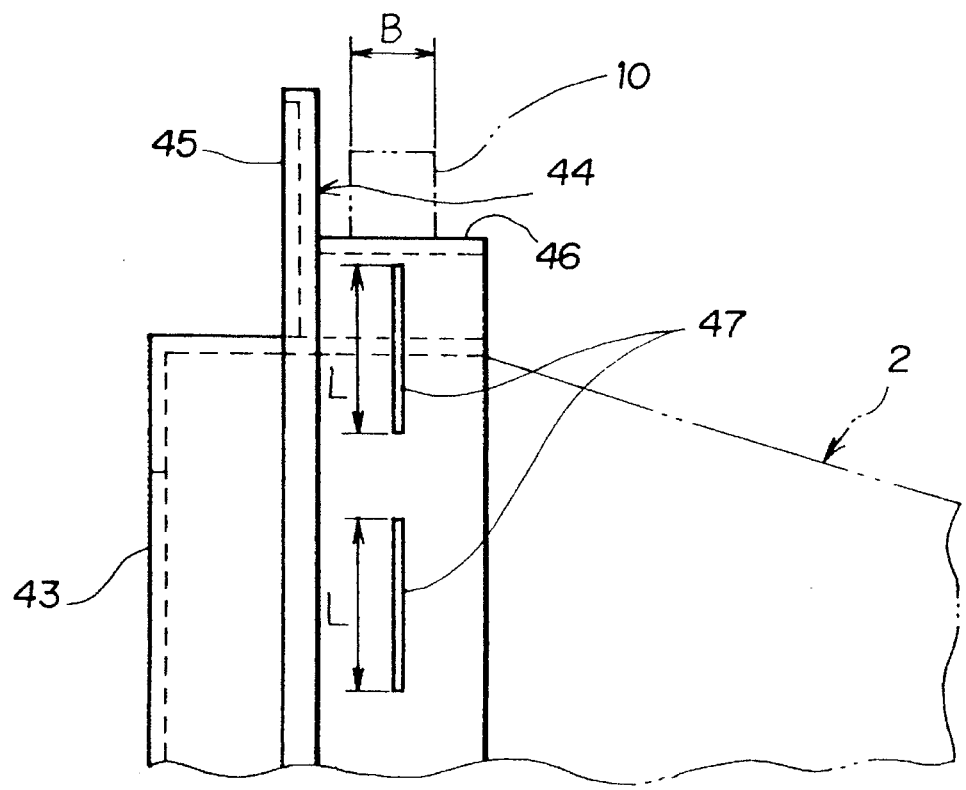
FIG. 14 (B) is a planar view showing the projection of the image rotation compensating coil of FIG. 14 (A) .

Note that there is a distance Y between the image rotation compensating coil 10 and the flange 44. Additionally, a projection 47 is provided at the coil winding area B of the coil winding element 46 as shown in FIG. 14(A). The projection has a height C which is the same as or smaller than the radius of the conductor 11. The projection 47 for retaining the image rotation compensating coil 10 can be provided at a center of the coil winding area B as shown in FIG. 14(B). A surface of the projection 47 contacting the conductor 11 is a circular arc so that a conductor 11 winding around a side of the projection 47 does not separate from another conductor winding around another side of the projection 47. Thus, the projection 47 is provided between two adhered conductors 11, contacting each so as to prevent the image rotation compensating coil 10 from shifting on the planar outside surface of the coil winding element 46 and/or from coming off the coil winding element 46.

The projection 47 has a length L, along the otherwise planar outside surface of the coil winding element 46. For example, the length L could be 30 mm as shown in FIG. 14(B). Further, a plurality of projections are provided at predetermined intervals along the circumference of the outside surface of the coil winding element 46. For example, the conductor wound at a left side of the projection is wound at a right side through the space provided between two projections 47. It prevents the conductor from getting on the projection 36 and cutting off. Also, the coil winding element 46 is shaped into an oval so as to prevent the image rotation compensating coil 10 from easily rotating.

Figure 15:
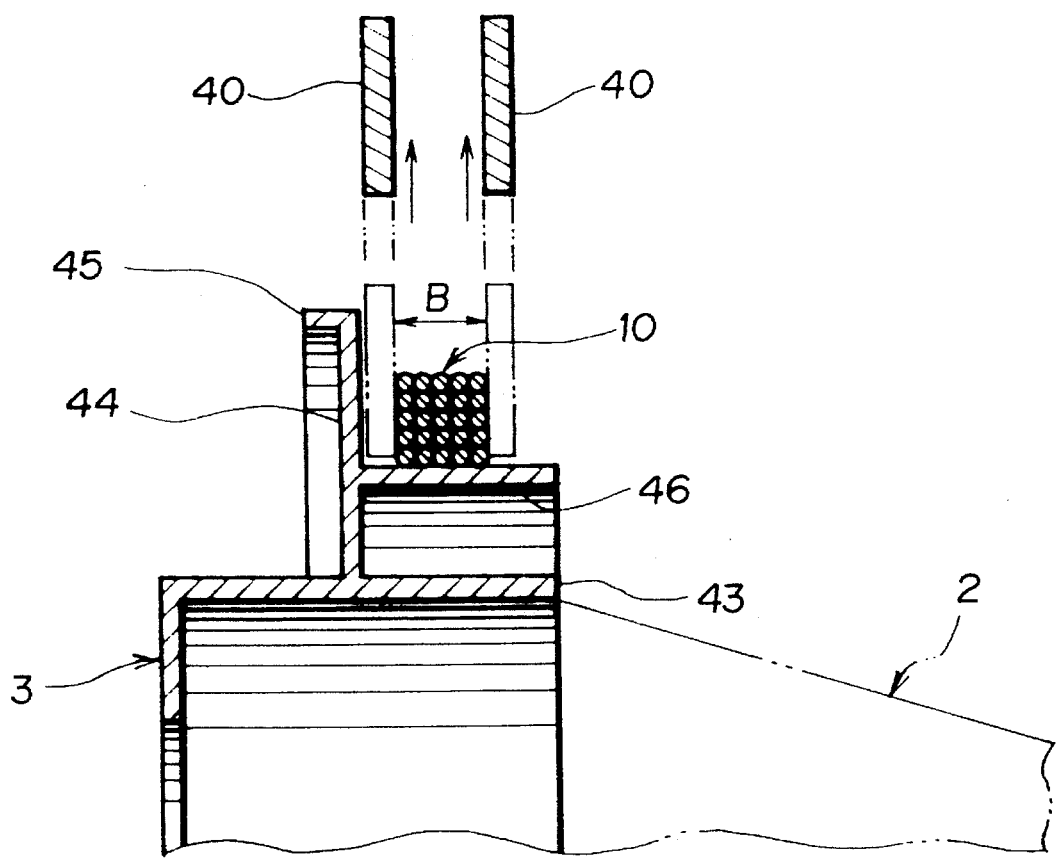
FIG. 15 is a view explaining a method for making an image rotation compensating coil.

To assemble the image rotation compensation coil 10, a coil winding apparatus 40 is provided at both sides of the coil winding area B as shown in FIG. 15 for forming the image rotation compensating coil 10. The conductor 11 is wound a certain number of turns within the area B. Then, after the conductor 11 is adhered and hardened, the coil winding apparatus 40 is detached. Therefore the image rotation compensating coil 10 is easily formed. The coil winding apparatus 40 is divided into two parts at its center, identical to that shown in FIG. 5B. As a result, it is easy to detach the coil winding apparatus 40 from the coil winding element 46 after forming the image rotation compensating coil 10, even though the coil winding element 46 has a flange 44 as shown in FIG. 15.

Figure 16:
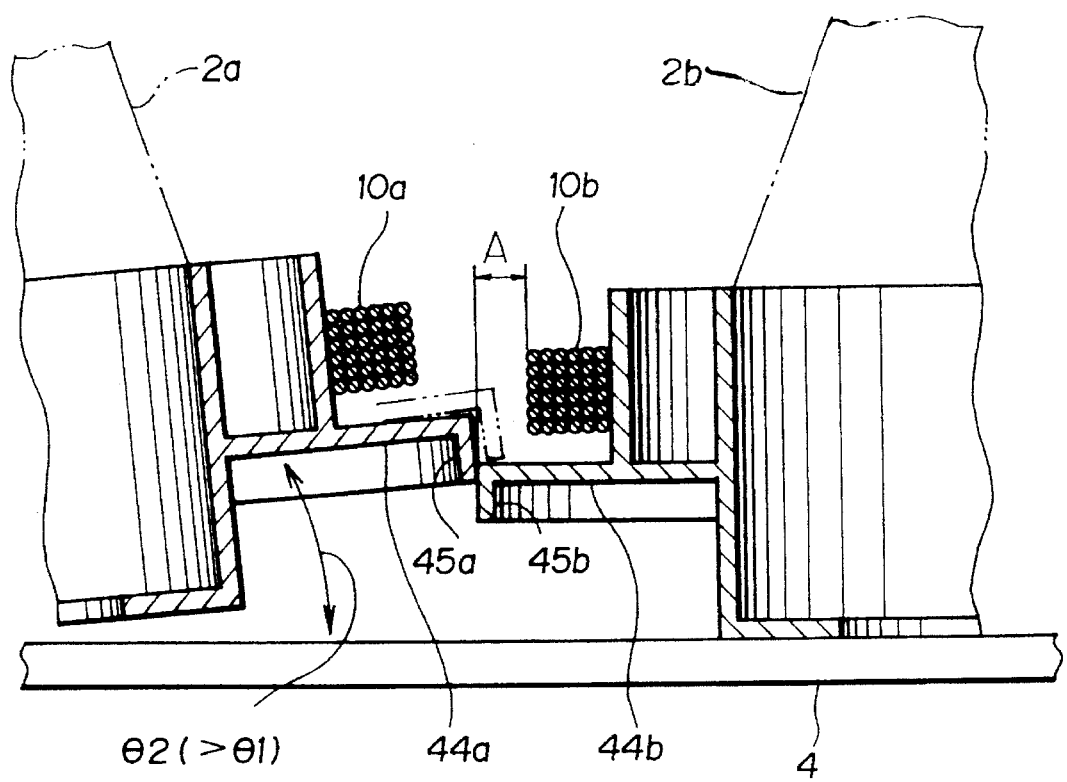
FIG. 16 is a view showing the image rotation compensating coil of FIG. 12 being conveyed in the manufacturing process.

As noted above, during the manufacturing process, a deflection yoke 2 having an image rotation compensating coil 10 is conveyed by a belt conveyer 4 for manufacture such as applying the deflection yoke 2 to a CRT 1 as shown in FIG. 16. Since there is a certain distance A between the outside surface of the image rotation compensating coil 10 and an end of the flange 44, even if a flange 44a of a deflection yoke 2a gets on top of another flange 44b of deflection yoke 2b, it is much less likely that the flange 44a contacts the image rotation compensating coil 10 compared to the prior art arrangement of FIG. 11. Therefore the present invention advantageously prevents the image rotation compensating coil 10 from being damaged.

Figure 11:
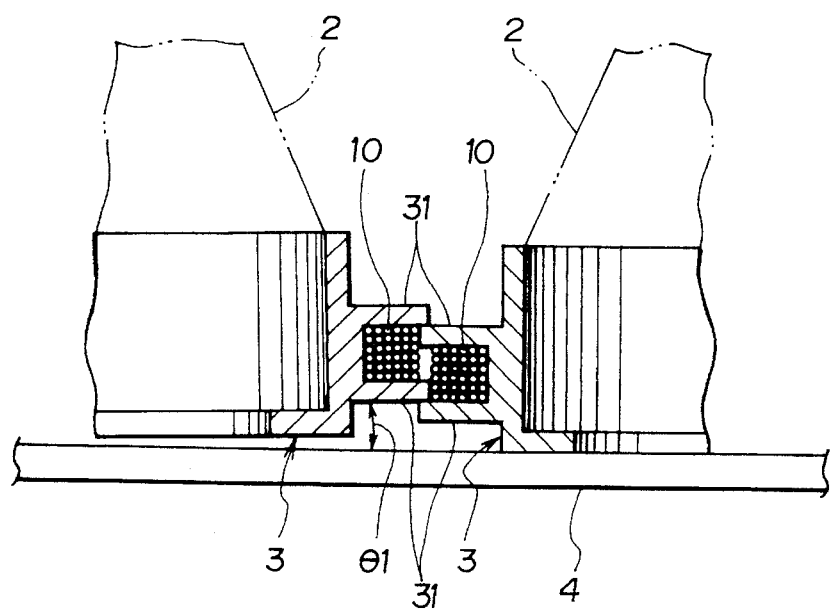
FIG. 11 is a view showing conventional image rotation compensating coils being conveyed in a manufacturing process.

Further, by providing an element 45 at an end of the flange 44, the deflection yoke 2 must incline to one side and at an angle 82, which is much greater than an inclining angle 81 (as shown in FIG. 11 and FIG. 16), for the deflection yoke 2a to get on top of the deflection yoke 2b. However, because the angle 82 is much greater than 81, it is unlikely that the deflection yoke 2a gets on the deflection yoke 2b. Therefore, the present invention advantageously prevents the image rotation compensating coil 10 from being contacted and damaged by the deflection yoke 2a.

Figure 17:
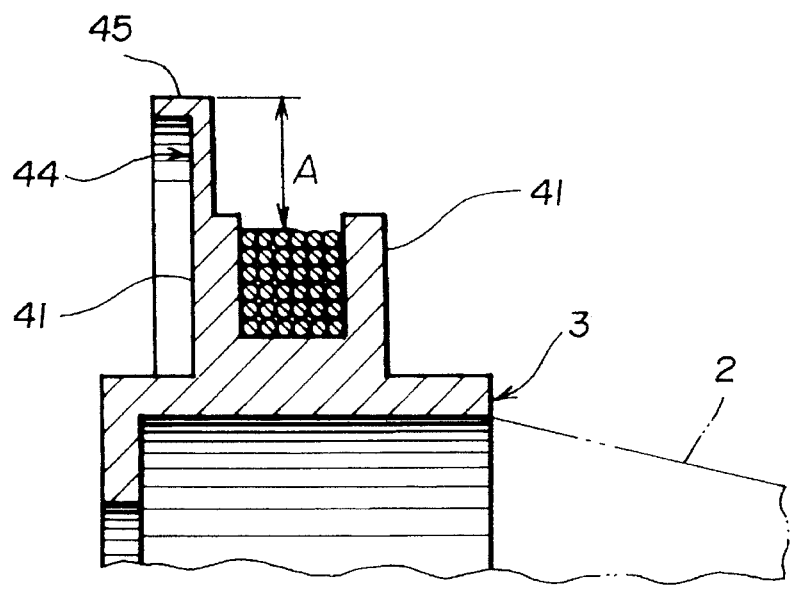
FIG. 17 is a cross-sectional view showing another example of a deflection yoke having an image rotation compensating coil.

The flange 44 and the tab element 45 may alternatively be provided at the coil cover 3 having the coil winding frame 41 as shown in FIG. 17. The above example discloses that the flange 44 and the tab element 45 are provided forward of the image rotation compensating coil 10. However the flange 44 and the tab element 45 may be provided in back of the image rotation compensating coil 10. Further, the tab element 45 may be provided in back of the flange 44.

The present invention discloses that the image rotation compensating coil is wound around the coil cover attached to a front end of the deflection yoke. Further, the present invention discloses that the flange projecting more than the outside surface of the image rotation compensating coil is provided at a position having a distance from the image rotation compensating coil and being forward or backward of the image rotation compensating coil.

Therefore even if a part gets on the flange, it is scarcely possible that the part reaches the image rotation compensating coil. It prevents the image rotation coil from being damaged by another part. Further, a projection having an appropriate width is provided at an end of the flange. It prevents another part from getting on the flange.

While this invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as falling within the scope of the appended claims.

What is claimed is:

1. A video display device for displaying an image on a screen in the presence of an external magnetic field capable of causing rotation of said image said device comprising:

a cathode ray tube including an electron gun and a screen, said electron gun arranged to emit an electron beam along a path toward said screen forming an image on said screen;

a deflection yoke arranged to deflect said electron beam and compensate for rotation of said image, said yoke positioned between said electron gun and said screen and having a first end facing said screen and a second end facing said gun:

a coil cover attached to a front part of said yoke and having a coil winding element, a conductor wound around said coil winding element to form a plurality of coil windings, said coil cover having at least one projection located between coil windings for retaining said conductor on said coil cover, said conductor having a first end and a second end; and a control means for producing a compensation current said control means coupled to said first and second ends of said conductor.

2. The video display device for displaying an image on a screen according to claim 1 wherein the height of said projection is no greater than the radius of said conductor.

3. The video display device for displaying an image on a screen according to claim 2 wherein a surface of said coil cover in contact with said conductor is substantially planar except for said at least one projection.

4. The video display device for displaying an image on a screen according to claim 2 wherein said coil winding element has a predetermined coil winding area for winding said conductor.

5. A video display device for displaying an image on a screen in the presence of an external magnetic field capable of causing rotation of said image, said device comprising:

a cathode ray tube including an electron gun and a screen, said electron gun arranged to emit an electron beam along a path toward said screen forming an image on said screen;

a deflection yoke arranged to deflect said electron beam and compensate for rotation of said image, said yoke positioned between said electron gun and said screen and having a first end facing said screen and a second end facing said gun:

a coil cover attached to a from part of said yoke and having a coil winding element, said coil winding element having an oval shape, a conductor wound around said coil winding element, said conductor having a first end and a second end; and a control means for producing a compensation current, said control means coupled to said first and second ends of said conductor.

6. The video display device for displaying an image on a screen in the presence of an external magnetic field capable of causing rotation of said image, said device comprising:

a cathode ray tube including an electron man and a screen, said electron gun arranged to emit an electron beam along a path toward said screen forming an image on said screen;

a deflection yoke arranged to deflect said electron beam and compensate for rotation of said image, said yoke positioned between said electron gun and said screen and having a first end facing said screen and a second end facing said gun:

a coil cover attached to a front part of said yoke and having a coil winding element with a coil winding area, a conductor wound around said coil winding element to form a plurality of coil windings, said conductor having a first end and a second end, said coil cover having one flange which extends higher than a highest wound surface of said conductor and is distant from said coil winding area; and a control means for producing a compensation current, said control means coupled to said first and second ends of said conductor.

7. The video display device for displaying an image on a screen according to claim 6 wherein a tab element is provided at an end of said flange projecting away from said coil winding area.

8. A deflection apparatus for use with a cathode ray tube, said cathode ray tube including an electron gun and a screen, said electron gun arranged to emit an electron beam along a path toward said screen forming an image on said screen in the presence of an external magnetic field causing rotation of said image, said apparatus comprising:

a deflection yoke arranged to deflect said electron beam and compensate for rotation of said image, said yoke positioned between said electron gun and said screen and having a first end facing said screen and a second end facing said gun and including a coil cover attached to a front part of said yoke and having a coil winding element, a conductor wound around said coil winding element to form a plurality of coil windings, said conductor having a first end and a second end, said coil cover having at least one projection located between coil windings for retaining said conductor on said coil cover; and a control means for producing a compensation current and coupled to said first and second ends of said conductor.

9. The deflection apparatus according to claim 8 wherein a height of said projection is no greater than the radius of said conductor.

10. The deflection apparatus according to claim 8 wherein a surface of coil cover in contact with said conductor is substantially planar except for said at least one projection.

11. The deflection apparatus according to claim 10 wherein said coil winding element has a predetermined coil winding area for winding said conductor to form a plurality of coil windings.

12. A deflection apparatus for use with a cathode ray tube, said cathode ray tube including an electron gun and a screen, said electron gun arranged to emit an electron beam along a path toward said screen forming an image on said screen in the presence of an external magnetic field causing rotation of said image, said apparatus comprising:

a deflection yoke arranged to deflect said electron beam and compensate for rotation of said image, said yoke positioned between said electron gun and said screen and having a first end facing said screen and a second end facing said gun and including a coil cover attached to a front part of said yoke and having a coil winding element, said coil winding element is oval, a conductor wound around said coil winding element, said conductor having a first end and a second end: and a control means for producing a compensation current and coupled to said first and second ends of said conductor.

13. A deflection apparatus for use with a cathode ray tube, said cathode ray tube including an electron gun and a screen, said electron gun arranged to emit an electron beam along a path toward said screen forming an image on said screen in the presence of an external magnetic field causing rotation of said image, said apparatus comprising:

a deflection yoke arranged to deflect said electron beam and compensate for rotation of said image, said yoke positioned between said electron gun and said screen and having a first end facing said screen and a second end facing said gun and including a coil cover attached to a from part of said yoke and having a coil winding element with a coil winding area, a conductor wound around said coil winding element, said conductor having a first end and a second end said coil cover having a flange which extends higher than a highest wound surface of said conductor and is distant from said coil winding area; and a control means for producing a compensation current and coupled to said first and second ends of said conductor.

14. The deflection apparatus according to claim 11, wherein a tab element is provided at an end of said flange projecting away from said coil winding area.

15. A method for assembling an image rotation compensating coil on a deflection yoke used with a cathode ray tube, said cathode ray tube including an electron gun and a screen, said electron gun arranged to emit an electron beam along a path toward said screen forming an image on said screen in the presence of an external magnetic field capable of causing rotation of said image, said method comprising the steps of:

attaching a coil cover to a front part of said deflection yoke, said coil cover having a coil winding element having a coil winding area defined by two ends for winding a conductor thereon;

providing a coil winding apparatus at both ends of said coil winding area;

winding said conductor a predetermined number of turns within said coil winding to form a plurality of coil windings, said conductor being in contact with only one surface of the coil winding element area: and said coil winding area of said coil winding element having at least one projection located between coil windings for retaining said conductor on said coil cover; and removing said coil winding equipment from said coil winding area.

16. The method according to claim 15, wherein the surface of said coil winding element in contact with said conductor is substantially planar except for said at least one projection.

17. The method according to claim 15 wherein a height of said projection is no greater than the radius of said conductor.

18. A method for assembling an image rotation compensating coil on a deflection yoke used with a cathode ray tube, said cathode ray tube including an electron gun and a screen, said electron gun arranged to emit an electron beam along a path toward said screen forming an image on said screen in the presence of an external magnetic field capable of causing rotation of said image, said method comprising the steps of:

attaching a coil cover to a front part of said deflection yoke, said coil cover having a coil winding element of oval shape with a coil winding area defined by two ends for winding a conductor thereon;

providing a coil winding apparatus at both ends of said coil winding area for winding said conductor within said coil winding area;

winding said conductor a predetermined number of turns within said coil winding area so that said conductor is in contact with only one surface of the coil winding element; and removing said coil winding apparatus from said coil winding area.

19. A method for assembling an image rotation compensating coil on a deflection yoke used with a cathode ray tube, said cathode ray tube including an electron gun and a screen, said electron gun arranged to emit an electron beam along a path toward said screen forming an image on said screen in the presence of an external magnetic field capable of causing rotation of said image, said method comprising the steps of:

attaching a coil cover to a front part of said deflection yoke, said coil cover having a coil winding element with a coil winding area defined by two ends for winding a conductor thereon;

winding said conductor a predetermined number of turns within said coil winding area so that said conductor is in contact with only one surface of said coil winding element;

providing a coil winding apparatus at both ends of said coil winding area for winding said conductor within said coil winding area, said coil cover having a flange which extends higher than a highest wound surface of said conductor and is distinct from said coil winding area; and removing said coil winding apparatus from said coil winding area.

20. The method according to claim 19, wherein a tab element is provided at an end of said flange projecting away from said coil winding area.

* * * * *